US006907728B2

(12) United States Patent
Cazier et al.

(10) Patent No.: US 6,907,728 B2
(45) Date of Patent: Jun. 21, 2005

(54) LOAD SENSING HYDRAULIC SYSTEM

(75) Inventors: Francis Cazier, La Neuville sur Oudeuil (FR); Thierry Delort, Saint Just en Chaussee (FR); Bertrand Duval, Sainte Foy (FR); Gilles Hoessler, Moretel de Mailles (FR); Patrick Lorriette, Catenoy (FR)

(73) Assignees: AGCO, S.A. (FR); Renault Agriculture, S.A. (FR)

( * ) Notice: Subject to any disclaimer, the term of this patent is extended or adjusted under 35 U.S.C. 154(b) by 4 days.

(21) Appl. No.: 10/413,464

(22) Filed: Apr. 14, 2003

(65) Prior Publication Data

US 2004/0069070 A1 Apr. 15, 2004

(30) Foreign Application Priority Data

Apr. 20, 2002 (GB) .............................................. 0209088

(51) Int. Cl.[7] .............................................. F16D 31/02
(52) U.S. Cl. .............................................. 60/430
(58) Field of Search .......................... 60/430, 429, 428

(56) References Cited

U.S. PATENT DOCUMENTS 3,760,689 A 9/1973 Johnston
5,081,837 A 1/1992 Ueno

FOREIGN PATENT DOCUMENTS

| | | |
|---|---|---|
| EP | 190431 | 12/1985 |
| EP | 989048 | 9/1999 |
| GB | 1565467 | 4/1980 |

*Primary Examiner*—Edward K. Look
*Assistant Examiner*—Michael Leslie
(74) *Attorney, Agent, or Firm*—MacMillan, Sobanski & Todd, LLC

(57) ABSTRACT

A load sensing hydraulic system includes two pumps, at least one hydraulic fluid consumer, and a pressure balance circuit. In the case of no demand from the consumer, hydraulic fluid flows from the pumps through the pressure balance circuit and to tank. In the case of demand from the consumer for hydraulic fluid at a flow rate less than or equal to the flow rate provided by the first pump, hydraulic fluid from the first pump flows to the consumer, and hydraulic fluid from the second pump flows to the tank. In the case of a demand from the consumer for hydraulic fluid at a flow rate greater than the capacity of the first pump, hydraulic fluid from both pumps flow to the consumer.

15 Claims, 5 Drawing Sheets

LOAD SENSING HYDRAULIC SYSTEM

BACKGROUND TO THE INVENTION

This invention relates to a load sensing hydraulic system for an agricultural vehicle, and in particular to a load sensing hydraulic system that delivers hydraulic fluid according to demand and that limits power losses.

In agricultural vehicles, many of the vehicle functions are hydraulically actuated. For example, on a tractor, the steering and clutch are often hydraulically actuated. Additionally, implements attached to the tractor often comprise hydraulic actuators, which require pressurized hydraulic fluid to operate them.

As tractors and the implements drawn by such tractors increase in size, the capacity of the tractor's hydraulic system must also be increased to meet the possible demands made on it.

It has been noted that increasing the flow of hydraulic fluid within the system to a level that meets the requirements of any demand placed on it gives rise to significant power losses and can lead to the hydraulic fluid overheating.

While some of the hydraulically powered functions of the vehicle are used frequently, others are used less frequently. It would therefore be desirable to provide a hydraulic system to match the supply of hydraulic fluid to the demand therefor.

SUMMARY OF THE INVENTION

The invention provides a load sensing hydraulic system comprising a first and second pump means, at least one hydraulic fluid consumer, and a pressure balance circuit, wherein: in the case of no demand from the consumers, hydraulic fluid flows from the first and second pump means through the pressure balance circuit and to tank; in the case of a demand from the consumers for hydraulic fluid at a flow rate less than or equal to the flow rate provided by the first pump means, hydraulic fluid from the first pump means flows to the consumers, and hydraulic fluid from the second pump means flows to tank; and in the case of a demand from the consumers for hydraulic fluid at a flow rate greater than the capacity of the first pump means, hydraulic fluid from both pump means flows to the consumers. Preferred features of the invention are described in the dependent claims, and the description following. In the context of the invention, tank means hydraulic fluid at a substantially lower pressure then hydraulic fluid exiting the pumps.

DETAILED DESCRIPTION OF THE PREFERRED EMBODIMENTS

Figure 1:
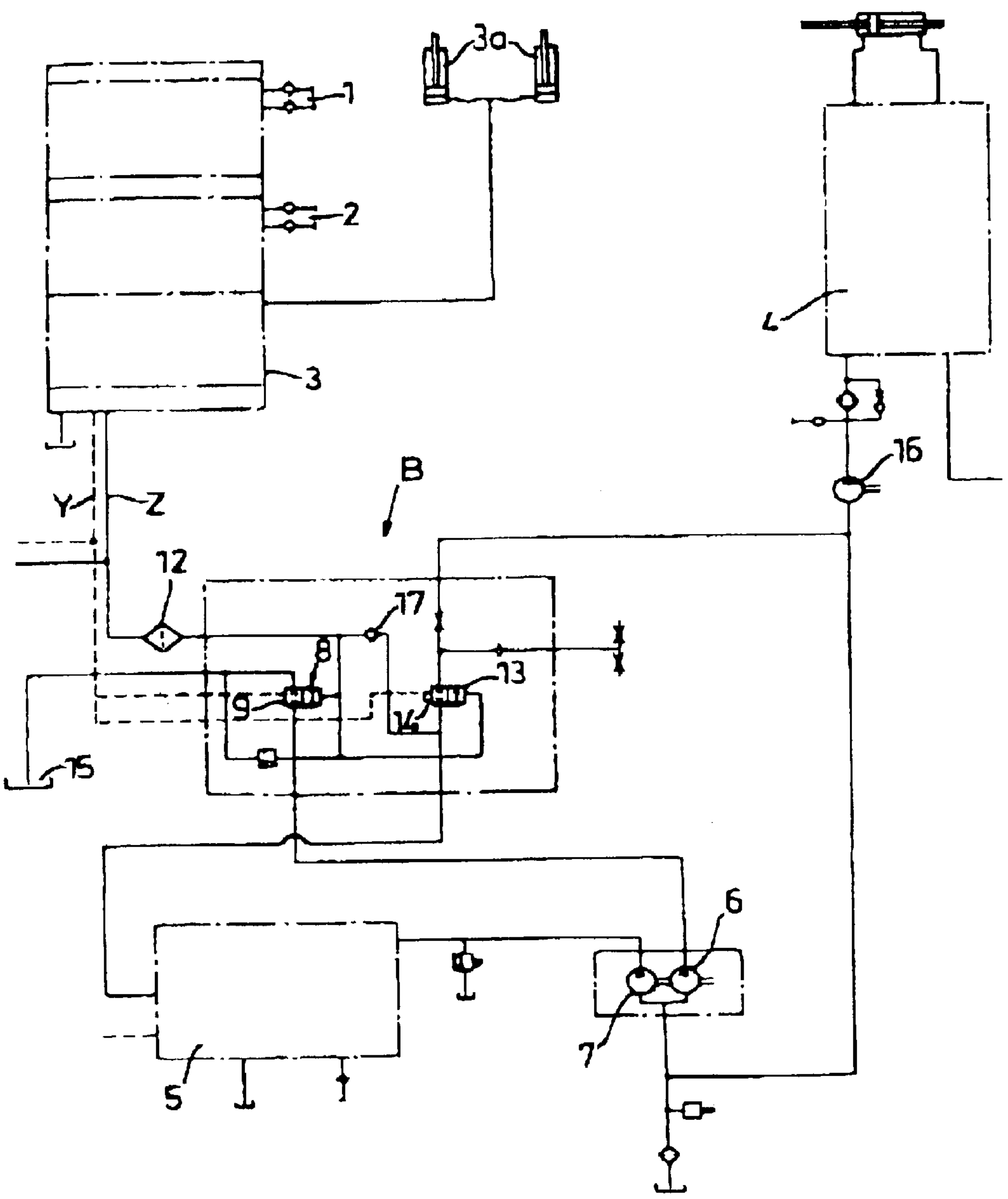
FIG. 1 is a hydraulic circuit diagram of a first embodiment of the system.

Referring now to FIG. 1, there is shown a load sensing hydraulic circuit for an agricultural tractor, the hydraulic circuit providing hydraulic fluid to hydraulic fluid consumers, namely: spool valves 1, 2, the hitch valve 3, the power steering 4, and the trailer braking system 5.

When there is no demand for hydraulic fluid from the consumers 1 to 3, the fluid from the first stage of the pump goes to the pilot heads of the valves blocks 8 and 13, switching them on and opening them to allow fluid from the first and second stages 6, 7 of the pump to pass to tank.

When there is a demand for hydraulic fluid from the consumers 1 to 3, but at less than the capacity of the first stage 6 of the pump, the load sensing pressure signal from line Y partially switches off the path through the valve block 8 to tank 15, the flow demanded by the spool valves being delivered via line Z. A pressure balance is created between the load-sensing signal Y, the pressure exerted by the first stage 6 of the pump and the force exerted by spring 9. The load-sensing signal Y and pressure from the first stage 6 of the pump act on the valve block 13 as well as the block 8. The valve block 13 is kept open due to the different forces acting on the block (note, spring 14 exerts a smaller force on valve block 13 than spring 9 does on valve block 8).

When the load sensing signal from line Y indicates that the demand from the consumers 1 to 3 is greater than the first stage 6 of the pump can meet, all the flow from the first stage 6 of the pump is directed to the spool valves. The first stage 6 is then overloaded and cannot maintain the pressure balance between the load sensing signal from line Y, the force exerted by spring 9, and the pressure exerted by the first stage 6. The pressure exerted by the first stage 6 falls to assume a new pressure balance between the load sensing signal Y, the pressure exerted by the first stage 6 of the pump, the pressure exerted by the second stage 7 of the pump, and the force exerted by the spring 14. The result is that the path through the valve block 13 is partially switched off, diverting the required flow of hydraulic fluid from the tank to the consumers 1 to 3.

When the demand from the consumers reaches the maximum deliverable by the first and second stages 6, 7 of the gear pump, the path through the valve block 13 to tank 15 is completely blocked off, and the hydraulic fluid flows only to the consumers 1 to 3.

Hydraulic fluid flowing from the first and second stages 6, 7 of the gear pump to the consumer 1 to 3 passes through the filter 12.

Figure 2:
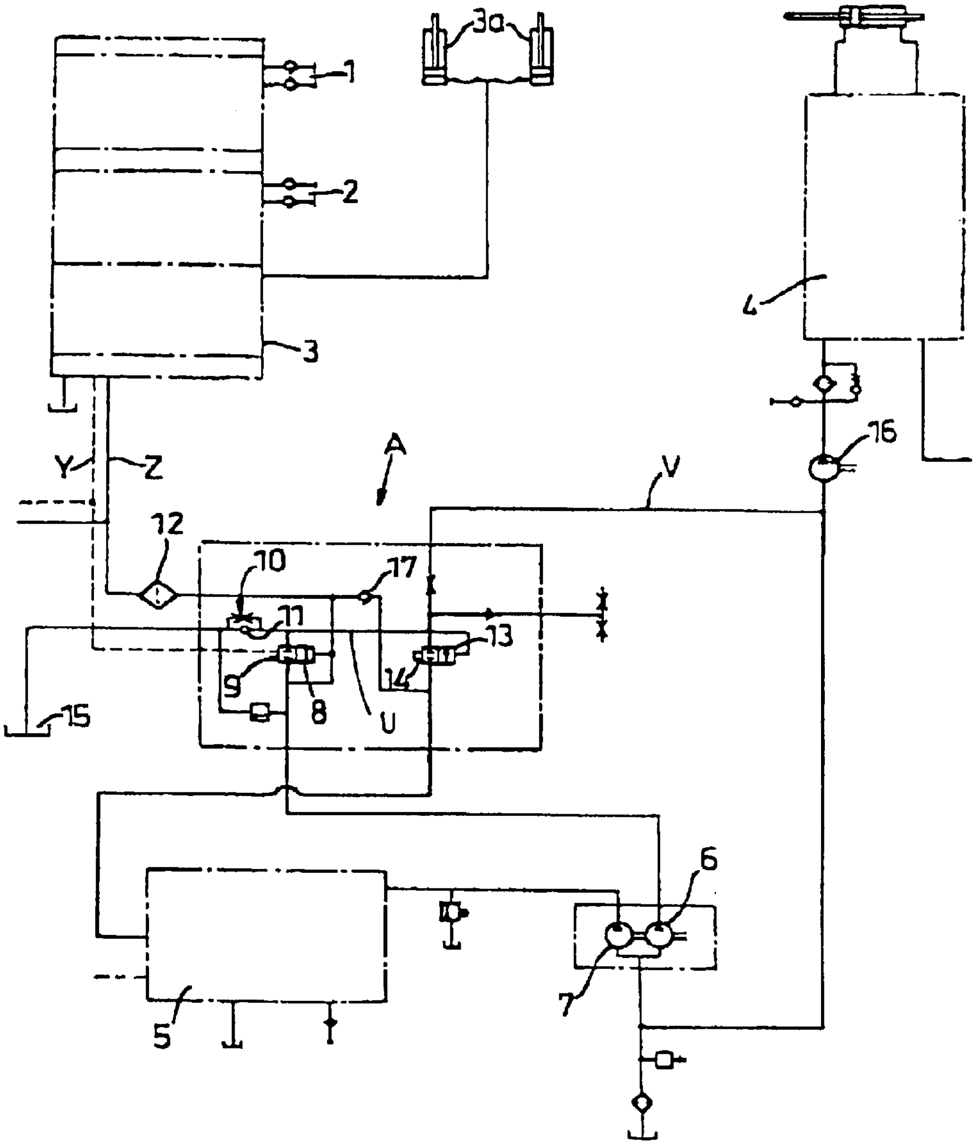
FIG. 2 is a hydraulic circuit diagram of a second embodiment of the system.

Referring now to FIG. 2, where like numerals are used to indicate like parts, the circuit comprises a two-stage gear pump having first and second stages 6, 7. The first stage 6 provides hydraulic fluid at a flow rate of thirty-three liters per minute, the second stage 7 providing hydraulic fluid at a flow rate of fifty-five liters per minute.

The circuit responds to the pressure in signal line Y, which is indicative of demand so that when there is a low demand on the hydraulic system, only the first stage 6 of the pump supplies hydraulic fluid to the consumers 1 to 3, with the second stage 7 of the pump delivering hydraulic fluid directly to tank. As the demand increases, flow from the second pump 7 is diverted from the tank to the consumers. The system therefore provides hydraulic fluid either at a flow rate of up to forty-two liters per minute, or at a flow rate between thirty-three and eighty-eight liters per minute, depending on demand.

The hydraulic circuit comprises a pressure balance arrangement generally indicated by the letter A. The pressure balance comprises first and second valve blocks 8, 13. The valve blocks 8, 13 each comprise a spring biased valves including springs 9, 14 respectively.

In the case of no demand from the consumers 1 to 3, there is no pressure in line Y, and the first and second stages of the gear pump delivers hydraulic fluid to tank. The first stage 6 of the pump delivers pressurized hydraulic fluid, which switches the pressure balance on. Pressurized fluid acts against the force of spring 9 to open the valve, thereby permitting hydraulic fluid to pass though the valve block 8. The hydraulic fluid passing through the constriction 10 and check valve 11 to tank 15 and generates a hydraulic pressure in the line U greater than the force of spring 14 so the valve 13 opens and hydraulic fluid from the second stage 6 of the pump flows through hydraulic line V.

Upon demand from the consumers 1 to 3 for hydraulic fluid at a flow rate of less than thirty-three liters per minute, a pressure signal is generated in the broken line Y. This pressure signal partially closes the valve 8 against the pressure generated by the first stage 6 of the pump. The demand at the spool valve is met via hydraulic line Z, and is filtered by filter 12. Whilst demand from the consumers 1 to 3 is less than forty-two liters per minute, there is a continued flow (the difference between the demand level and forty-two liters per minute) of hydraulic fluid through the constriction 10 and check valve 11. This continued flow causes a pressure drop across the constriction 10 and check valve 11 such that the pressure in line U is sufficient to overcome the force exerted by the spring 14, and hence hydraulic fluid from the second stage of the pump continues to flow to tank. The check valve 17 prevents flow from stage 6 to stage 7 of the gear pump.

In the case where the demand exceeds thirty-three liters per minute, the full capacity of the first stage 6 of the pump passes through the hydraulic line Z, and the flow through the constriction 10 and check valve falls to zero. As a result, there is no pressure drop across the constriction 10 and check valve 11, and hence no hydraulic pressure is exerted against the spring 14. The spring 14 closes the valve 13 and the hydraulic fluid delivered by the second stage 7 of the pump flows through line Z to the consumers via the filter 12.

Pressurized hydraulic fluid will always be available from the second stage 7 of the pump for the trailer brakes 5.

Demand by the power steering system 4 for pressurized hydraulic fluid is met by the hydraulic pump 16.

Referring again to FIG. 1, the pressure balance of the hydraulic circuit will be described in more detail. The pressure balance B is comprised of a two-stage gear pump having a first stage 6 and a second stage 7. The outputs of the stages 6 and 7 are connected to the valve blocks 8 and 13 respectively. The spring 9 exerts a greater force than does the spring 14. The output to the spool valves is via line Z. A check valve 17 is located in line Z in order to avoid flow of hydraulic fluid from the first stage 6 to second stage 7 of the pump.

The valve block 8 includes two control inputs, one on each side. The first control input is the pressure exerted by first stage 6 of the pump, the second being the load sensing signal, received via line Y from the consumers 1 to 3 (see FIG. 1).

The valve block 13 includes two control inputs, one on each side thereof, i.e. the load sensing signal, from the consumers 1 to 3 (via line Y), and the pressure signal from the first stage 6 of the pump.

Demand for pressurized hydraulic fluid for the power steering system 4, and low pressure consumers such as clutches, is met by a separate pump 16. Demand for hydraulic fluid from the trailer brake valve is met by the second stage 7 of the gear pump.

Figure 3:
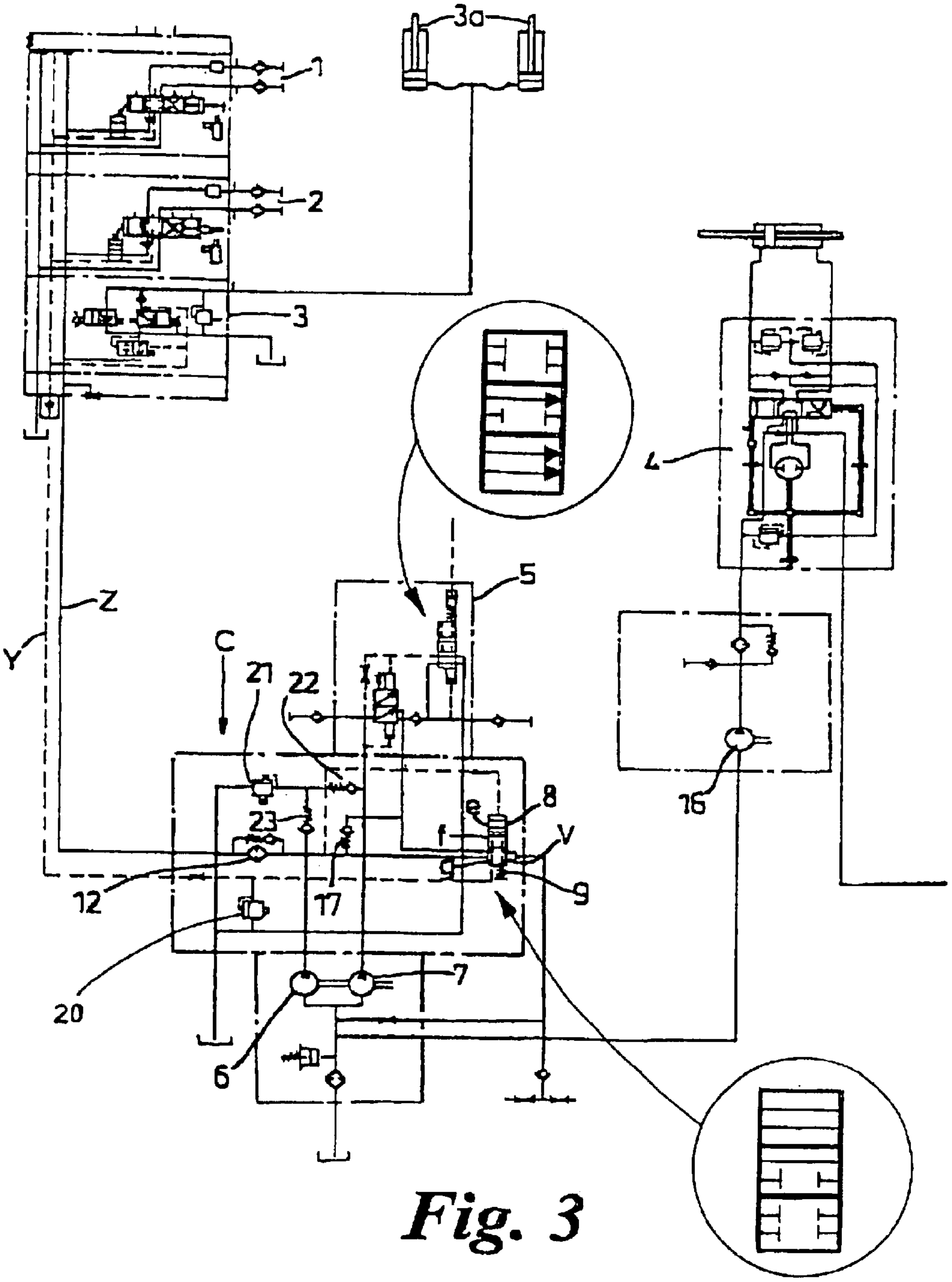
FIG. 3 is a hydraulic circuit diagram of a third embodiment of the system.

Referring now to FIG. 3, there is shown a load sensing hydraulic circuit for an agricultural tractor, the hydraulic circuit providing fluid to hydraulic consumers, namely: spool valves 1, 2, hitch valve 3, power steering 4 and the trailer brake valve 5.

The circuit comprises a two-stage gear pump having first and second stages 6 and 7. The first stage provides pressurized hydraulic fluid at a flow rate at thirty-three liters/minute, the second at fifty-five liters/minute.

The circuit responds to demand so that when there is no demand from the consumers 1 to 3, both stages of the pump deliver to tank; when there is a low demand on the hydraulic system, only the first stage 6 of the pump supplies hydraulic fluid to the consumers 1 to 3, the second stage delivering hydraulic fluid to tank; and as the demand from the consumers 1 to 3 increases, flow from the second stage 7 is diverted from tank to the consumers 1 to 3.

The hydraulic circuit comprises a pressure balance indicated by the letter C. The pressure balance block comprises a four-way, three position valve 8, three check valves 17, 22, and 23 and two pressure relief valves 20 and 21.

In case of no demand from any consumer 1 to 3, the two-stage pump delivers pressurized hydraulic fluid, which switches the main valve 8 to the position E. Hydraulic fluid from both stages 6, 7 of the pump passes through the valve 8 directly to tank.

Upon demand from consumers 1 to 3 for hydraulic fluid at a flow rate of less than the capacity of stage 6, a pressure signal is generated in the broken line Y. This pressure signal moves the valve 8 to position F and partially closes the line from stage 6 to tank to provide flow under pressure at the spool valve via the hydraulic line Z. The oil from the stage 7 continues to pass through the valve 8 to the tank.

The check valves 17 and 22 prevent flow from the stage 6 of the gear pump to stage 7 thereof.

In the case where there is a demand from hydraulic fluid greater than the capacity of the first stage 6 of the pump, the pressure generated by the first stage 6 falls slightly, unbalancing the spool valve 8, which moves to position G and closes the lines from each stage to the tank to deliver the flow from the two-stages to the consumers 1 to 3 through the line Z via the filter 12, which protects all the spool valves and hitch valves from contamination.

On the block, a main pressure relief valve 21 limits the maximum pressure in the hydraulic line for each pump stage to protect the trailer brake valve (5) (flow passes through the check valve 22), the spool valves and the hitch valve (flow passes through check valves 17 and 23 for stage 7; flow passes through check valve 23 only for stage 6). This main pressure relief valve is a safety valve for the circuit and limits the pressure peaks in the consumers.

A second relief valve 20 is situated on the load sensing line Y of the valve block. The relief valve 20 limits the maximum pressure of the pump by limiting the demand from the consumers 1 to 3.

In the case of maximum pressure demand without flow (i.e. a cylinder at the end of its stroke), the relief valve 20 limits the pressure from line Y and balances the valve 8 in position F instead of G to allow the flow from the second stage 7 of the gear pump to pass through the valve directly to tank and to limit the power losses, since just one pump is under pressure, rather than two.

Figure 4:
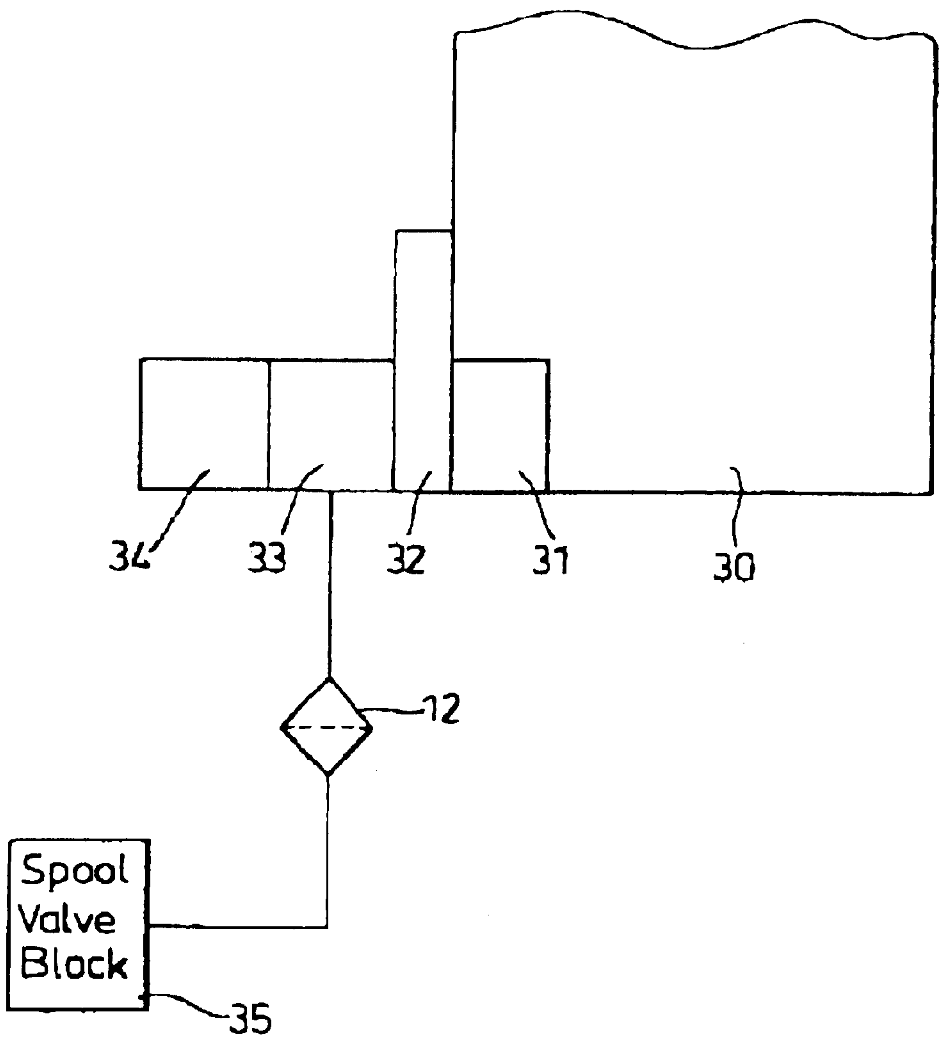
FIG. 4 is a block diagram of part of an assembly comprising a pressure balance circuit of the type described with reference to FIGS. 1 to 3.
Figure 5:
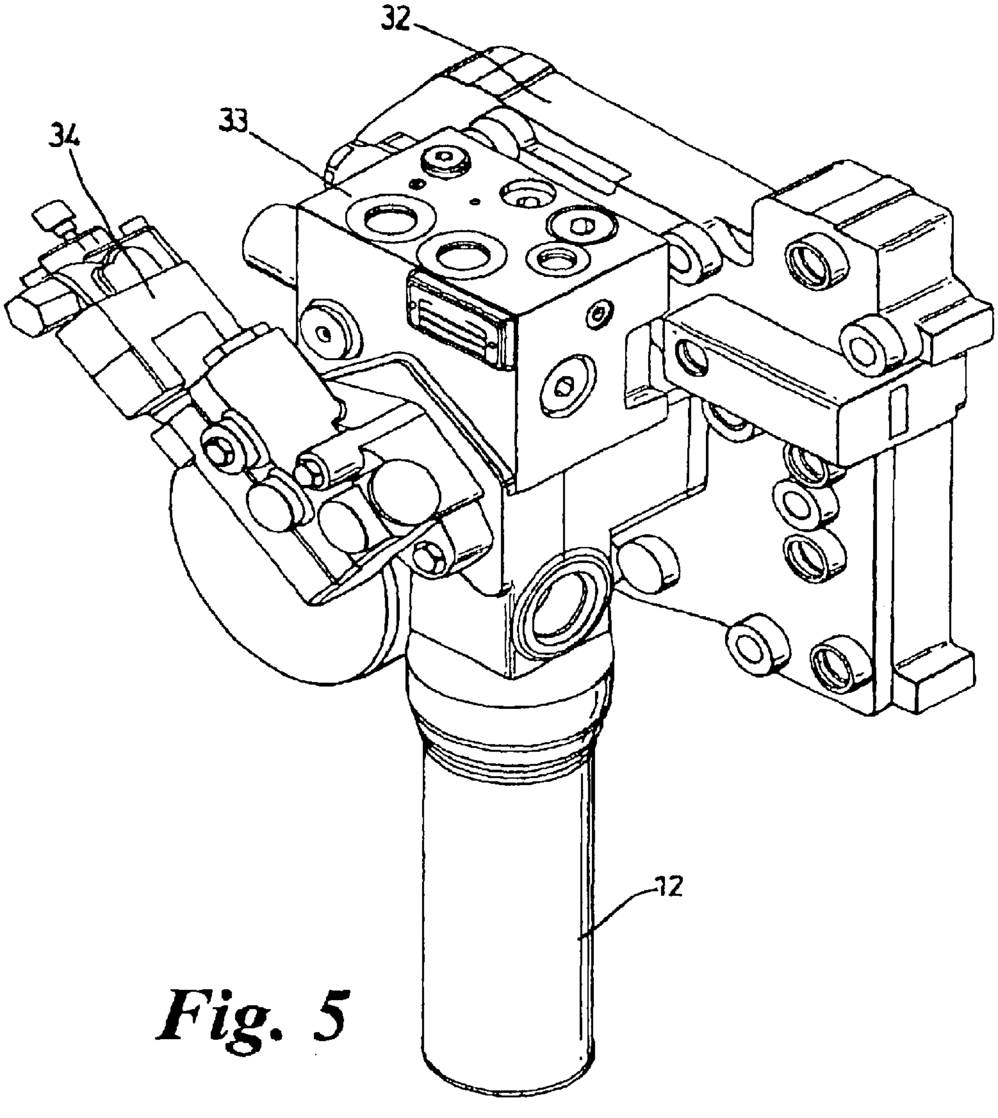
FIG. 5 is a schematic representation of the assembly shown in FIG. 4.

Referring now to FIGS. 4 and 5, there is shown a part of the transmission casing 30 of an agricultural tractor. The tractor is not shown since such machines are well understood by those skilled in the art. With reference to these figures, like reference numerals are used to indicate like parts.

Two gear pumps indicated generally by the reference numeral 31 for pumping hydraulic fluid are mounted in the transmission casing. A cover plate 32 is removably attachable to the transmission housing 30 in order to give access to the pumps 31 and other components mounted within the transmission housing 30. A pressure balance 33 is mounted on the cover plate 32, the pressure balance being hydraulically connected to the pumps 31. A trailer braking valve 34 is attached to one side of the pressure balance 33. A spool valve 35 is arranged downstream of the pressure balance 33, and in fluid connection therewith. Hydraulic fluid passing through the pressure balance 33 passes through a filter 12 en route to the spool valve block 35.

By arranging the pressure balance 33 on the cover, and placing the filter 12 between the pressure balance 33 and the spool valves 7, only one filter is required as opposed to two if the pressure balance is mounted on the input plate of the spool valve block.

The load sensing hydraulic system of the invention uses considerably less energy than many known systems, because the flow rate of hydraulic fluid is matched to the need placed on the system by the consumers. Another feature of the invention is that the hydraulic fluid in the system is not heated as a result of being pumped around at a flow rate which may be well above that which is required.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A load sensing hydraulic system comprising two pump means, at least one hydraulic fluid consumer, and a pressure balance circuit, wherein;

in the case of no demand from the consumers, hydraulic fluid flows from each of the pump means through the pressure balance circuit and to tank;

in the case of a demand from the consumers for hydraulic fluid at a flow rate less than or equal to the flow rate provided by the first pump means, hydraulic fluid from the first pump means flows to the consumers, and hydraulic fluid from the second pump means flows to tank; and in the case of a demand from the consumers for hydraulic fluid at a flow rate greater than the capacity of the first pump means, hydraulic fluid from both pump means flows to the consumers;

wherein the pressure balance circuit includes a pair of valve blocks, each of the valve blocks including a spring biased valve, and wherein the outputs of the first and second pumps are each connected to a respective one of the valve blocks on the upstream side of the spring biased valve, and wherein each valve block includes at least one control input, the pressure at the control input working against the spring to open the valve, and wherein the control input for the second valve block senses the demand for hydraulic fluid on the first pump means, and wherein the flow of hydraulic fluid from the second pump means is diverted from tank to the consumers when the control signal indicates that the demand from the consumers is greater than the capacity of the first pump means; and wherein the control input to the second valve block is connected to the hydraulic line from the first valve block to tank; and wherein the hydraulic line includes a check valve.

2. A load sensing hydraulic system according to claim 1, wherein the hydraulic line includes a throttle in parallel with the check valve.

3. A load sensing hydraulic system according to claim 2, wherein the check valve and throttle in combination create a back pressure upstream thereof in the hydraulic line, thereby providing the control signal to the second valve block.

4. A load sensing hydraulic system according to claim 3, wherein the second valve block comprises two control inputs, one being connected to the pressure signal line, and the other being connected to the output line of the first pump means.

5. A load sensing hydraulic system according to claim 1, wherein the check valve creates a back pressure upstream thereof in the hydraulic line, thereby providing the control signal to the second valve block.

6. A load sensing system according to claim 1, wherein a pressure signal line connects the consumers to the first valve block, and in the case of demand from the consumers, the pressure exerted by the pressure signal at least partially closes the valve, diverting some or all of the flow of hydraulic fluid generated by the first pump means from the reservoir to the consumers.

7. A load sensing hydraulic system according to claim 1, wherein the spring constants of the springs of the respective spring biased valves are different.

8. A load sensing hydraulic system according to claim 1, wherein the first and second pump means consists of a two-stage gear pump, and wherein the first stage of the gear pump acts as a first pump, and the second stage acts as a second pump.

9. A load sensing hydraulic system according to claim 8, wherein the two-stage gear pump means consist of a first gear pump and a second gear pump.

10. A load sensing hydraulic system according to claim 8, further comprising a filter in the hydraulic line connecting the output of the pressure balance to the input of the consumers.

11. A vehicle comprising a transmission casing and a hydraulic system, wherein the hydraulic system includes a load sensing hydraulic system according to claim 1, and wherein the pump means are mounted within the transmission casing, and the pressure balance of the load sensing hydraulic system is mounted on a cover plate on the transmission casing, and wherein a filter is arranged between the pressure balance and the consumers, whereby any hydraulic fluid passing through the pressure balance must pass through the filter before entering the consumers.

12. A vehicle according to claim 11, wherein the cover is removably attachable to the housing.

13. A vehicle according to claim 11, wherein the vehicle is an agricultural tractor.

14. A load sensing hydraulic system comprising first and second pump means, at least one hydraulic fluid consumer and a pressure balance circuit, wherein the pressure balance circuit includes a three position valve including at least one input and at least one output, an output of the first pump means and an output of the second pump means each being connected to a respective input of the valve, the valve being connected to and receiving a switching signal from a load sensing line, and the at least one output of the valve directing hydraulic fluid from the pump means to the or each consumer or to tank, characterized in that:

in the case of no demand from the consumer a pressure balance is established with the valve in the first position, such that hydraulic fluid flows from each of the pump means through the pressure balance circuit and to tank;

in the case of a demand from the consumers for hydraulic fluid at a flow rate less than or equal to the flow rate provided by the first pump means a pressure balance is established with the valve in the second position, such that hydraulic fluid from the first pump means flows to the consumers, and hydraulic fluid from the second pump means flows to tank; and in the case of a demand from the consumers for hydraulic fluid at a flow rate greater than the capacity of the first pump means a pressure balance is established with the valve in the third position, such that hydraulic fluid from both pump means flows to the consumers.

15. A load sensing hydraulic system according to claim 14, wherein the pressure balance circuit includes a pressure relief valve, and when the load sensing line indicates a requirement for maximum pressure demand with zero flow, the pressure relief valve limits the pressure in load sensing line, and sets up a pressure balance with the valve in the second position, flow of hydraulic fluid from the second pump means being diverted to tank.

* * * * *